Sept. 13, 1949.   B. JORGENSEN   2,481,756
LASTING MACHINE
Filed March 19, 1947   8 Sheets-Sheet 1

Inventor
Bernhardt Jorgensen
By his Attorney

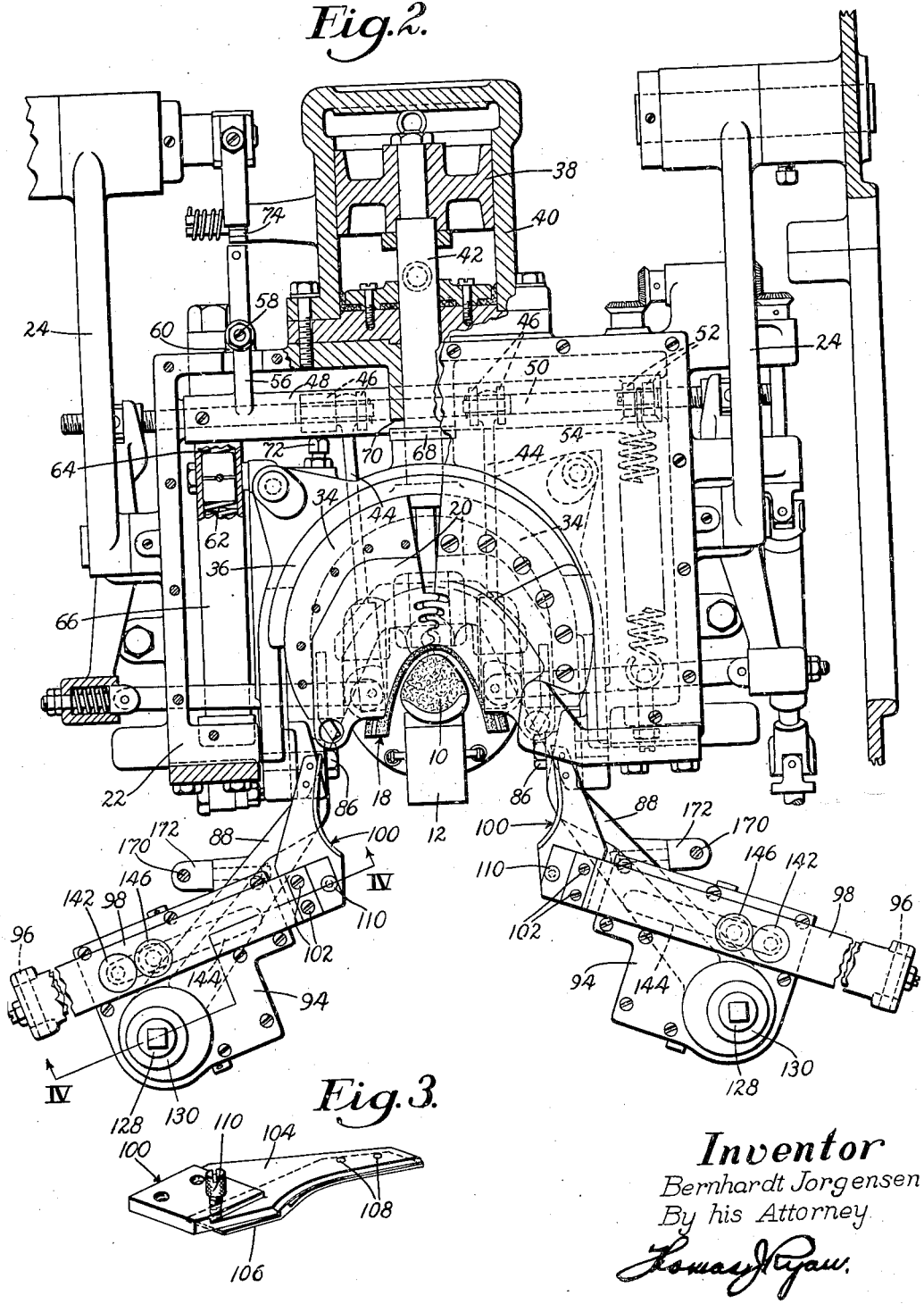

Sept. 13, 1949. B. JORGENSEN 2,481,756
LASTING MACHINE
Filed March 19, 1947 8 Sheets-Sheet 3
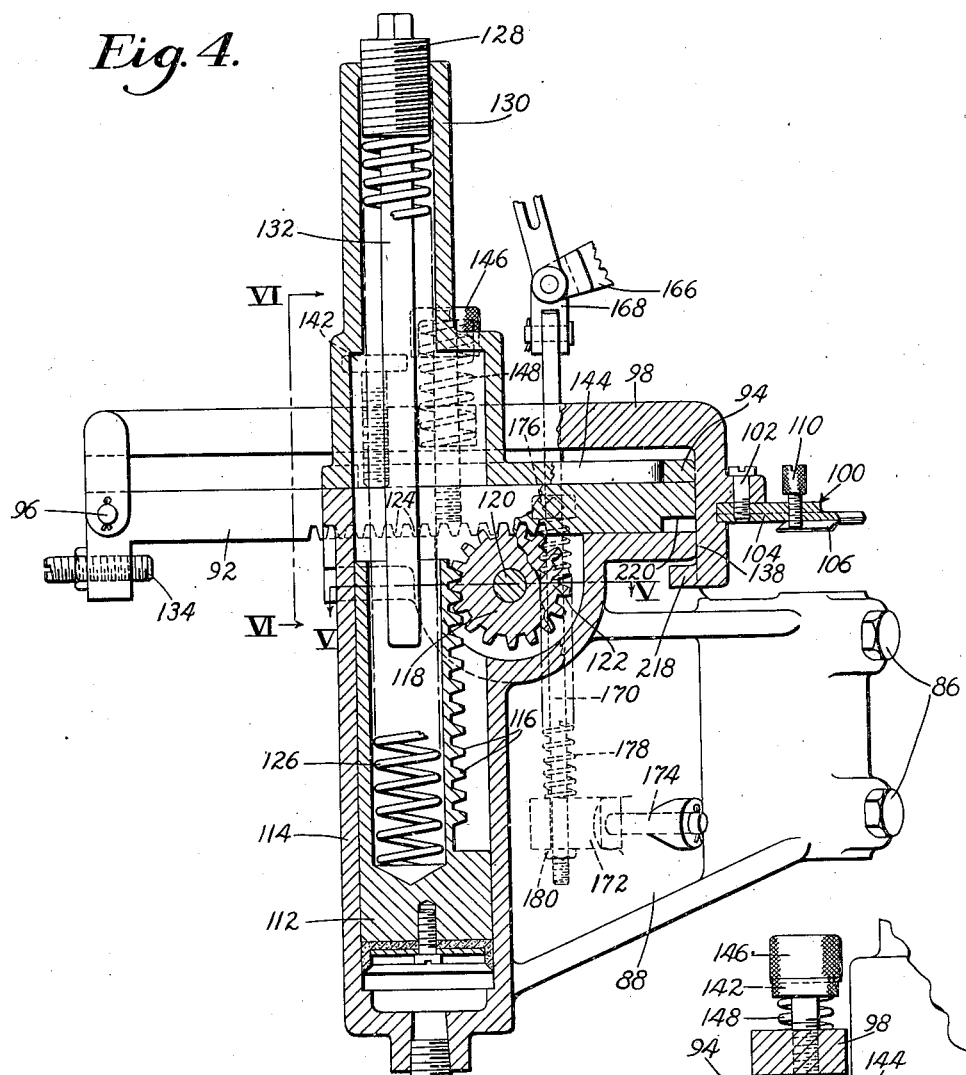
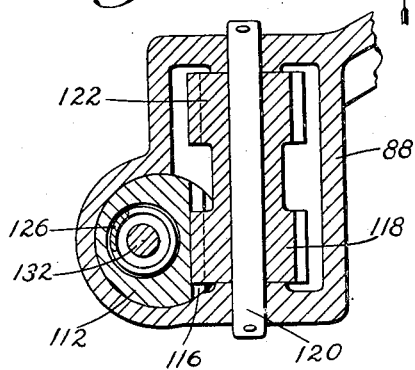
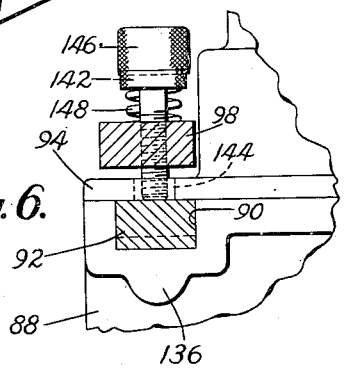
*Inventor*
Bernhardt Jorgensen
By his Attorney

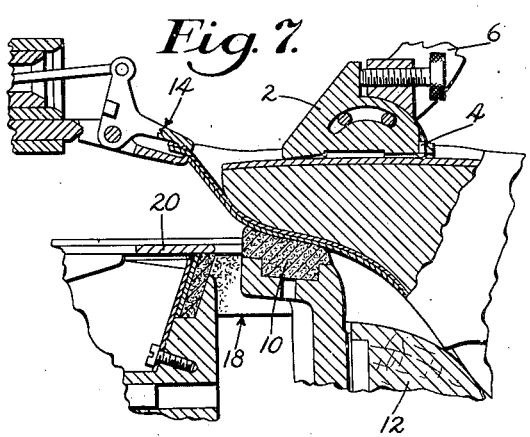
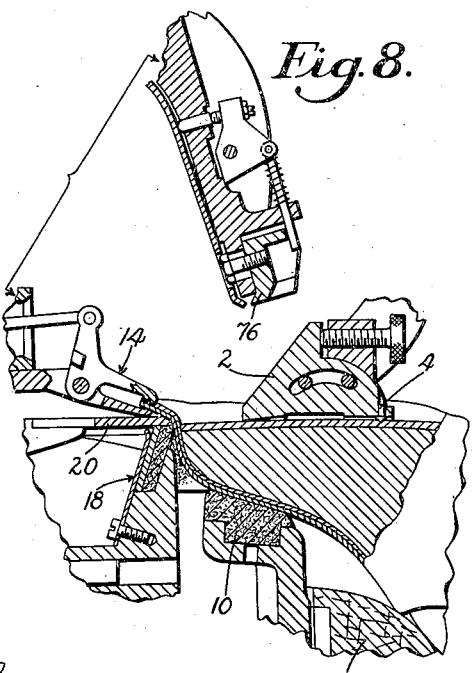
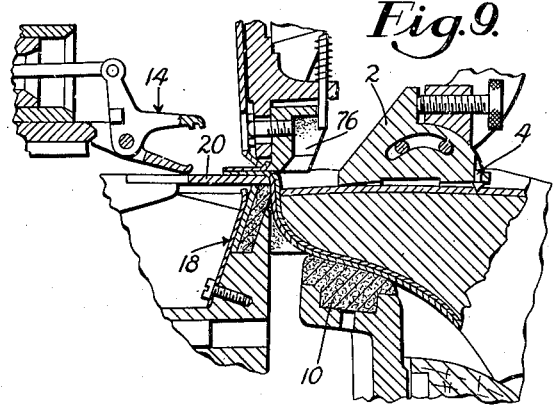
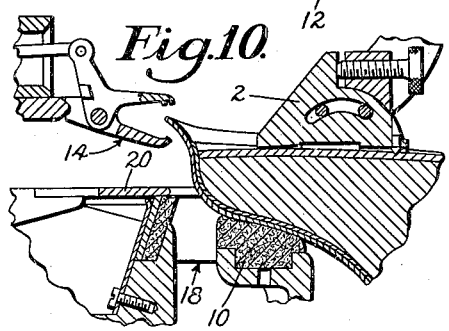
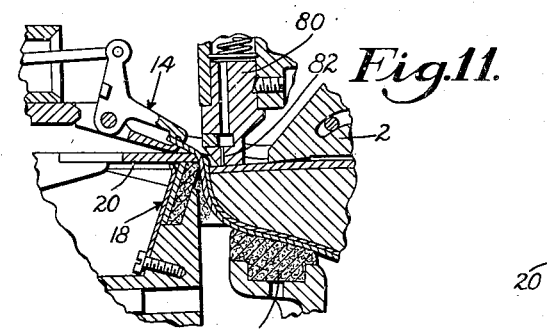
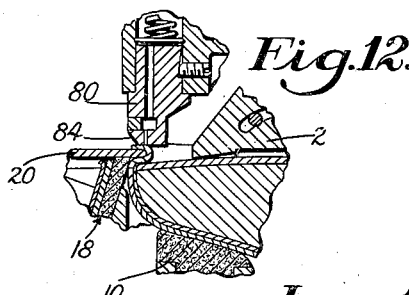
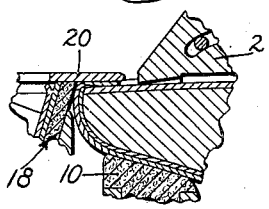
Inventor
Bernhardt Jorgensen
By his Attorney

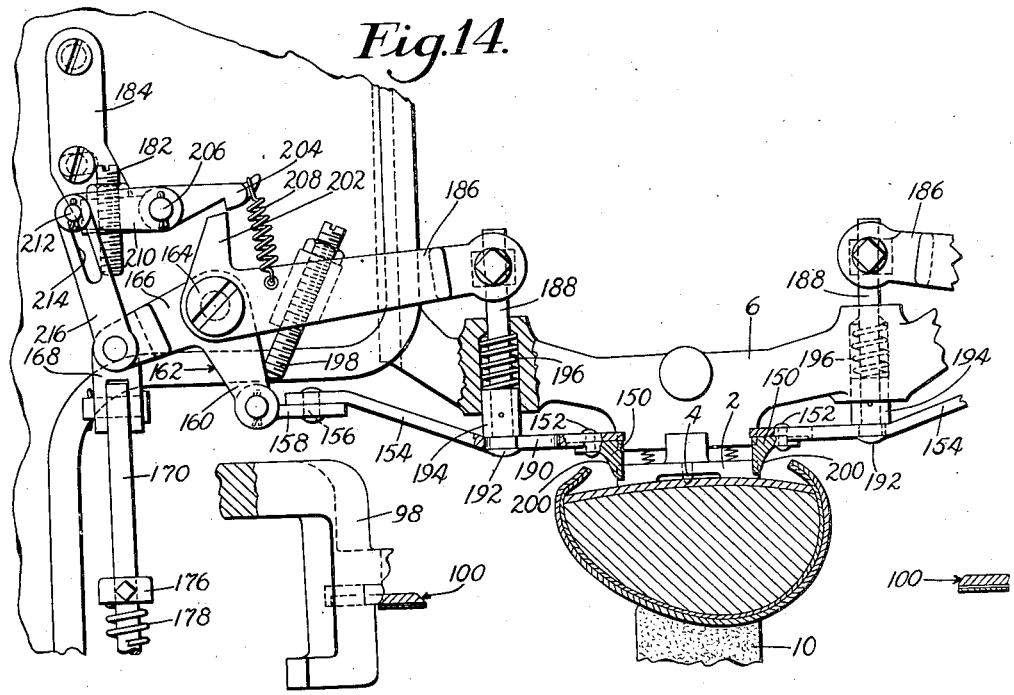
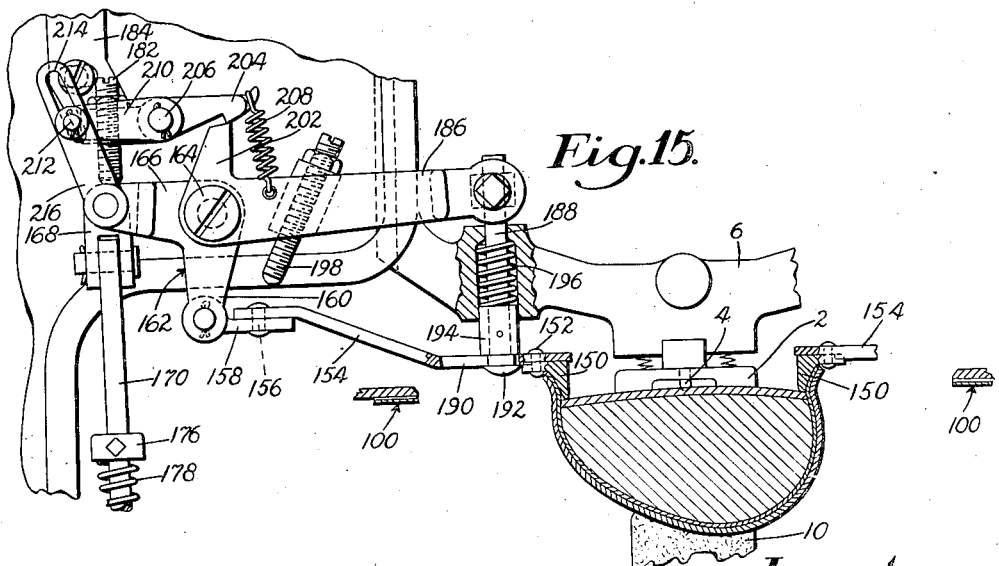

Sept. 13, 1949.  B. JORGENSEN  2,481,756
LASTING MACHINE
Filed March 19, 1947  8 Sheets-Sheet 6
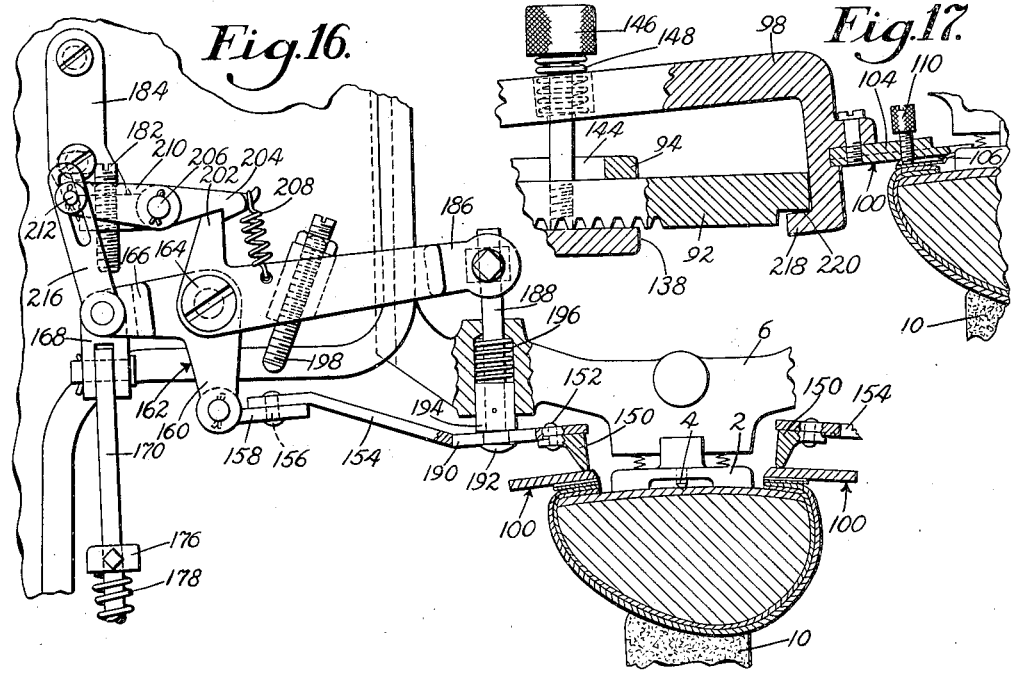
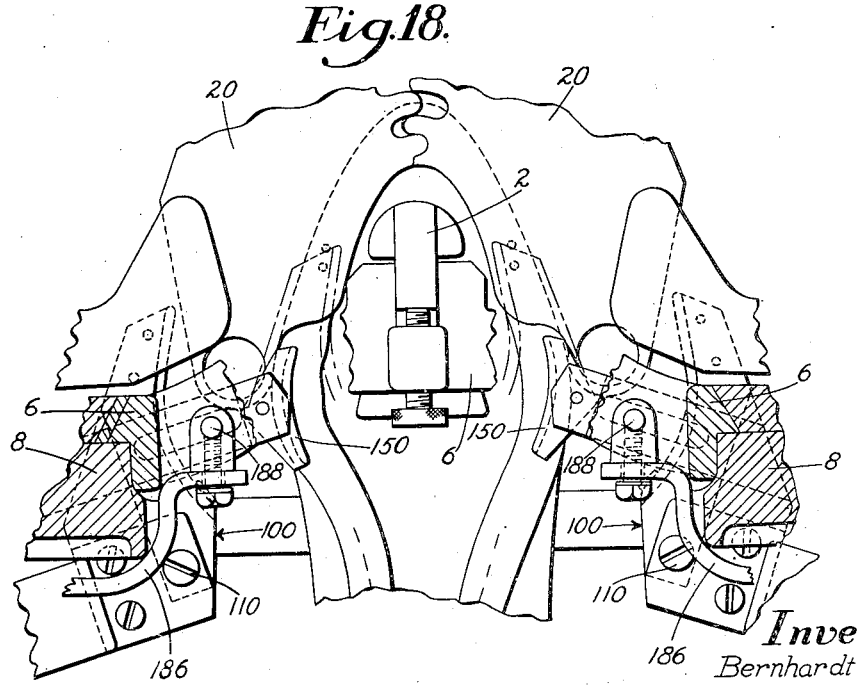
Inventor
Bernhardt Jorgensen
By his Attorney Sept. 13, 1949.  B. JORGENSEN  2,481,756
LASTING MACHINE
Filed March 19, 1947  8 Sheets-Sheet 7

Inventor
Bernhardt Jorgensen
By his Attorney

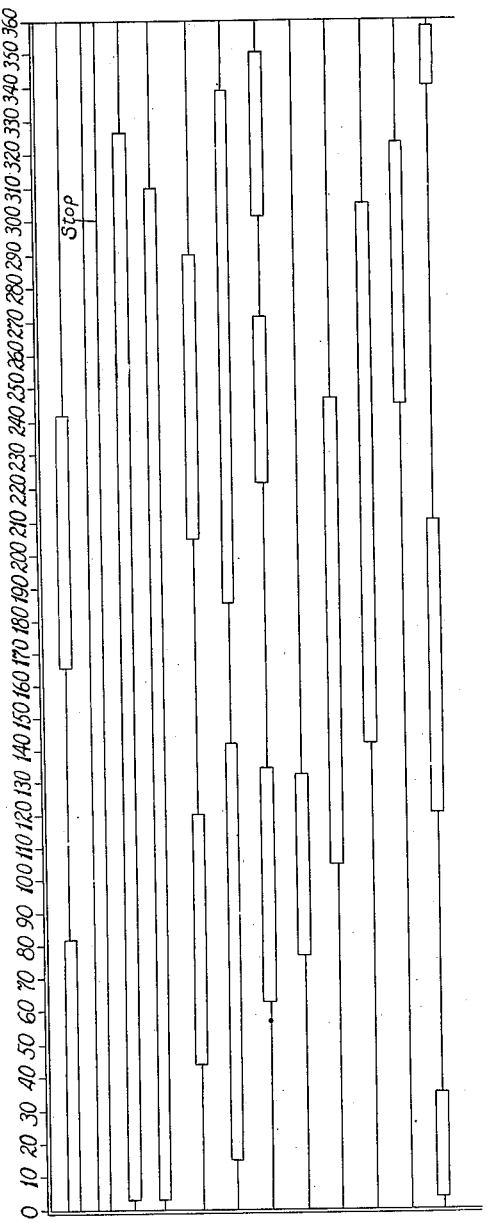

Patented Sept. 13, 1949

2,481,756

UNITED STATES PATENT OFFICE 2,481,756

LASTING MACHINE

Bernhardt Jorgensen, Marblehead, Mass., assignor to United Shoe Machinery Corporation, Flemington, N. J., a corporation of New Jersey Application March 19, 1947, Serial No. 735,711

49 Claims. (Cl. 12—8.5)

This invention relates to lasting machines and is herein shown as applied to a machine constructed generally as disclosed in United States Letters Patent No. 2,337,558, granted on December 28, 1943, on an application of mine, some portions of the machine being more fully shown and described in Letters Patent No. 2,324,509, granted on July 20, 1943, on another application of mine. It is to be understood, however, that in various novel aspects the invention is not limited to the illustrative disclosure.

The machine shown in the above-mentioned Letters Patent No. 2,337,558 is a toe-lasting machine provided with a toe former movable heightwise of the last to conform the toe-end portion of a multi-ply upper to the contour of the last by a wiping action thereon, with means for trimming from the margin of the toe end of the upper while it is held so conformed all but the outer layer of the upper materials, and with toe wipers which are movable heightwise of the last with the toe former and are later operated to wipe the margin of the outer layer of the upper inwardly over an insole on the last into position to be secured to the insole by cement. The machine is also provided with grippers which grip the margin of the several layers of the upper at the end and the sides of the toe, respectively, and pull it outwardly over the wipers preparatory to the upper-trimming operation, the grippers releasing the upper in proper time relation to the operation of the trimming means. After the trimming operation the upper is released also by the toe former, which is retracted lengthwise and heightwise of the last, and the operations of pulling it and of wiping it heightwise of the last are repeated, the grippers acting this time only on the outer layer of the upper materials. Cement is then applied to the toe end of the shoe and the wipers wipe the margin of the outer layer inwardly over the insole as above described. The machine is an automatic machine in which the various instrumentalities are operated at the proper times by fluid-pressure means to which operating fluid, preferably oil, is supplied from a common source where the fluid is maintained under pressure.

An object of the present invention is to provide means for also lasting the shoe along the sides of the forepart beyond its toe portion. For this purpose the machine herein shown includes side wipers which wipe the margin of the upper inwardly over the insole from the toe portion to the beginning of the shank portion, these wipers being moved heightwise of the last with the toe former and the toe wipers when the toe end of the upper is first wiped heightwise of the last by the toe former, since they are carried by a support common also to the toe former and the toe wipers. After the trimming of the toe end of the upper, but prior to retractive movement of the above-mentioned support heightwise of the last preparatory to the second wiping action of the toe former on the upper, the side wipers are operated to wipe the upper inwardly over the insole, and they remain in engagement with the overwiped margin of the upper as the support is thus retracted while tipping relatively to the support to increase their pressure on portions of the margin of the upper adjacent to the edge of the insole. While they are over the insole the side wipers receive movements lengthwise of the last with an ironing action on the margin of the upper coordinately with similar movements of the toe former between its first and second wiping movements heightwise of the last. After the second wiping movement of the toe former heightwise of the last the side wipers are withdrawn from over the insole in time to clear the toe wipers which are moved far enough lengthwise of the last to overlap portions of the margin of the upper previously engaged by the side wipers. For operating the side wipers the construction shown comprises cylinder-and-piston devices carried by the above-mentioned support.

The machine herein shown also includes members arranged to clamp the margin of the upper against the edges of the side wipers and having the functions of what are commonly known as retarders as these wipers begin their wiping action on the upper, thus insuring that the upper will be tightly conformed to the last and the insole. The invention further provides novel means for controlling these retarders, the construction shown comprising means for imparting to them positioning movements both heightwise of the last into engagement with the insole and outwardly over the insole toward the edge thereof in response to the movement of the above-mentioned wiper support heightwise of the last prior to the wiping operations of the side wipers. As the side wipers are moved inwardly over the insole the retarders are moved heightwise of the last away from the insole by pressure of the margin of the upper thereon, and devices also controlled by movement of the wiper support heightwise of the last are provided for holding the retarders against return movements toward the insole when the side wipers are withdrawn from over the insole, thus avoiding any interference between the retarders and the toe wipers in the movements of the latter over portions of the margin of the upper previously wiped in by the side wipers.

The above and other features of the invention, including various novel details of construction and combinations of parts, will now be more particularly described with reference to the accompanying drawings and thereafter pointed out in the claims.

In the drawings,

Fig. 2 is mainly a plan view, but with parts broken away, showing the toe wipers and side wipers and portions of the machine associated therewith;

Fig. 3 is a perspective view of one of the side wipers detached;

Fig. 4 is a section on the line IV—IV of Fig. 2;

Fig. 5 is a section on the line V—V of Fig. 4;

Fig. 6 is a section on the line VI—VI of Fig. 4;

Figure 19:
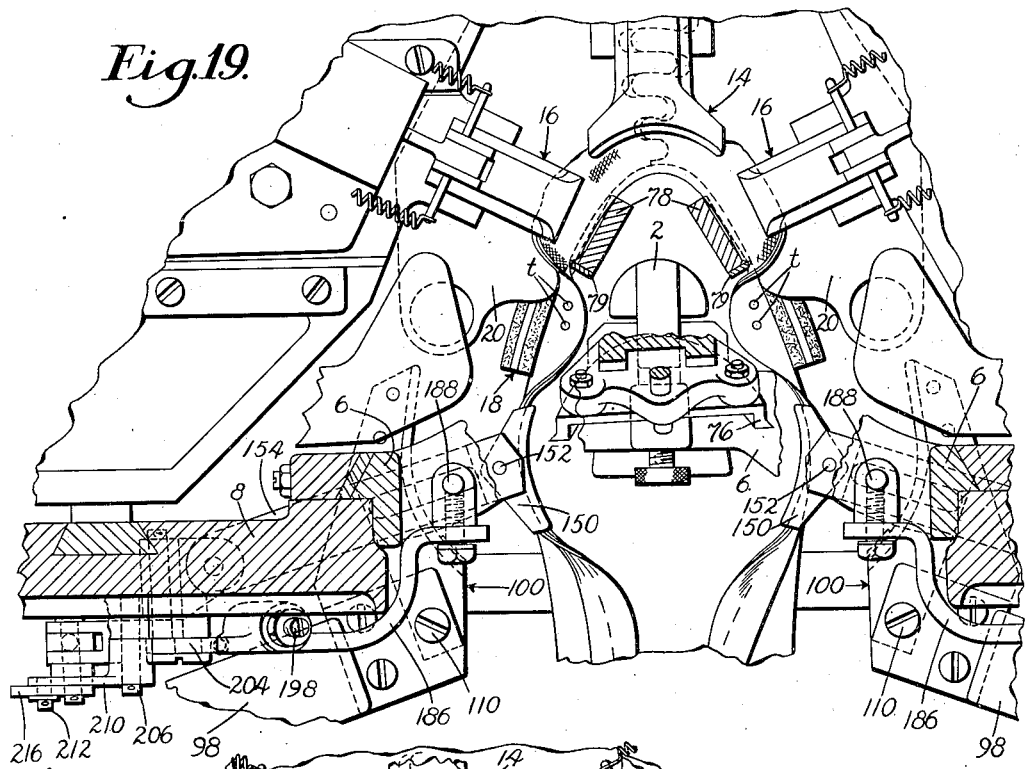
Figure 20:
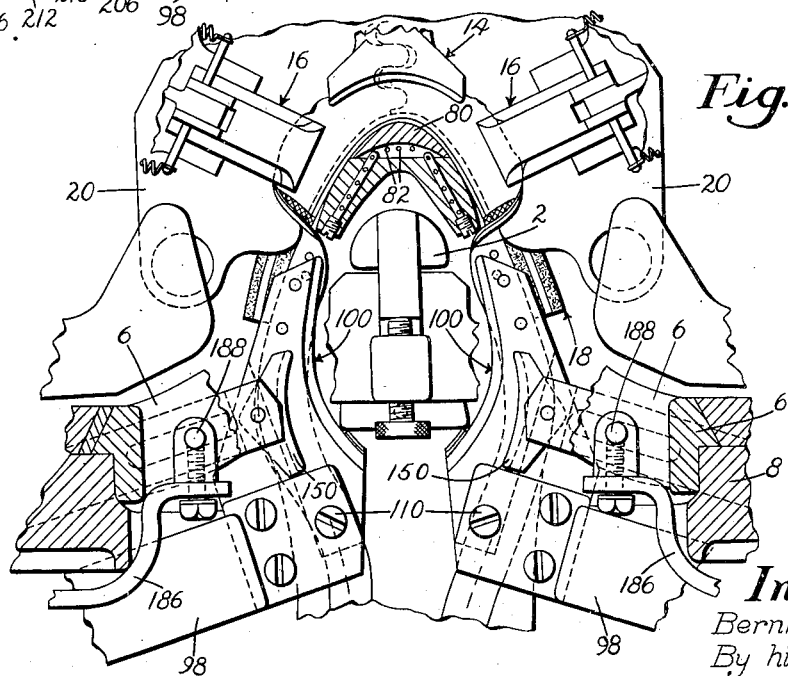

Figs. 7 to 13 inclusive are views mainly in vertical section illustrating the relation of the toe-end portion of the shoe to the parts which operate thereon at different times in the course of the operation of the machine;

Fig. 14 is a view mainly in front elevation, with parts broken away, showing the retarders which cooperate with the side wipers and portions of the retarder-controlling mechanisms as they appear at the stage in the operation of the machine illustrated in Fig. 7;

Fig. 15 is a view similar to Fig. 14, but with the parts as they appear at the stage in the operation illustrated in Fig. 8;

Fig. 16 is a view similar to Fig. 15, with the parts as they appear at the stage illustrated in Fig. 10;

Fig. 17 is a view similar to a portion of Fig. 4, but with the parts as they appear at the time indicated in Fig. 16;

Fig. 18 is mainly a plan view, with parts in section, showing the toe wipers and side wipers at the stage in the operation of the machine illustrated in Fig. 13;

Fig. 19 is also a plan view, with parts in section, showing the parts as they appear at the earlier stage in the operation illustrated in Figs. 8 and 15;

Fig. 20 is a view similar to Fig. 19, with the parts as they appear at the stage illustrated in Fig. 11; and Fig. 21 is a chart illustrating the timing of the various operations performed in the cycle of operations of the machine.

In view of the disclosures in the previously mentioned Letters Patent and in others hereinafter mentioned, only as much of the earlier construction of the machine herein shown as it is necessary to refer to for an understanding of the present invention will be herein described. For positioning the shoe there is provided a shoe rest member 2 which engages the bottom of the forepart of the insole when the shoe is presented to the machine by the operator, this member having thereon a spur 4 arranged to enter an indentation previously formed in the insole in predetermined relation to the edge of the shoe bottom, as more particularly disclosed in Letters Patent No. 2,391,461, granted on December 25, 1945, on an application of mine. The side gages therein shown for further positioning the toe end of the shoe laterally are, however, omitted. The member 2 is supported on a casting 6 vertically adjustable along guideways on the frame 8. Substantially at the beginning of the cycle of power operations of the machine the shoe is clamped against the member 2 by upward movements of a toe rest 10 and an instep support 12, as illustrated in Fig. 7, and near the beginning of the cycle also a heel rest 13 (Fig. 1) is moved into supporting engagement with the heel-end face of the shoe. These parts and others hereinafter described are operated by fluid-pressure means to which operating fluid is admitted at the proper times by valves controlled by a rotatable drum (not shown), as disclosed in Letters Patent No. 2,337,558, this drum making one complete rotation in each cycle of operations.

For applying a pull to the toe-end portion of the upper the machine is provided with a toe-end gripper 14 arranged to grip the margin of the upper about the end of the toe and with two side grippers 16 arranged to grip it at the sides of the toe (Fig. 19). The margin of the upper is positioned outspread between the open jaws of these grippers when the shoe is presented to the machine and they are closed on the upper by fluid-pressure means in response to depression of a treadle (not shown) prior to the starting of the cycle of operations. Shortly after the beginning of the cycle the toe-end gripper is moved lengthwise of the last and the side grippers widthwise of the last to pull the upper, the grippers also receiving short upper-pulling movements heightwise of the last. While the grippers are holding the upper under tension a toe former 18 which embraces the toe-end portion of the shoe is moved upwardly to wipe the upper heightwise of the last. Associated with this toe former are toe-embracing wipers 20 which later wipe the margin of the toe end of the upper inwardly over the insole. The toe former and the wipers are carried upwardly by what may be termed a toe head 22 (Fig. 2) supported on two pairs of parallel links, the upper link of each pair being shown at 24. For moving the toe head upwardly there are provided two fluid-operated pistons 26 (Fig. 1) mounted in cylinders 28, its upward movement being limited by engagement of lugs 30 thereon with screws 32 mounted on the frame of the machine. When the fluid is released from the cylinders 28 the toe head is moved downward by gravity.

The toe wipers 20 are secured on the tops of two wiper holders 34 (Fig. 2) which are guided by a wiper carrier 36 for swinging movements about an axis extending heightwise of the shoe to close the wipers inward laterally of the shoe, and the wiper carrier 36 is supported by the toe head 22 to move relatively to the toe head in directions lengthwise of the shoe. Such movements of the wiper carrier are effected by a fluid-operated piston 38 movable in a cylinder 40 fast on the toe head 22, the piston being connected to the wiper carrier by a piston rod 42. When operating fluid is admitted to the rear end of the cylinder 40 the wiper carrier 36 and the wipers 20 are advanced bodily lengthwise of the shoe, and by means not herein shown in detail the wiper holders 34 are operated to close the wipers inward laterally of the shoe in response to this movement of the carrier. When the fluid is admitted to the front end of the cylinder the wipers are retracted and opened. The toe former 18 is movably supported on the wiper holders 34, as fully disclosed in Letters Patent No. 2,337,558, and is controlled by two rearwardly extending links 44 the rear ends of which are connected to the lower ends of two downwardly extending forked arms 46 formed integral with a sleeve 48 fast on a rockshaft 50 mounted in bearings in the toe head 22. Another downwardly extending arm 52 integral with the sleeve 48 is connected at its lower end to a spring 54 which tends to turn the sleeve in the direction to impart forward movement to the toe former. To limit such movement of the toe former there is integral with the sleeve 48 an arm 56 provided with a screw 58 arranged to engage a lug 60 on the toe head 22. By adjustment of this screw the toe former is positioned in the proper relation to the toe head for the wiping of the upper heightwise of the last. The normal position of the wiper carrier 36 lengthwise of the shoe, when there is no pressure in the cylinder 40, is determined by two springs 62 and 64 mounted in a cylinder 66 which is supported on the toe head, the springs being arranged to act on the wiper carrier through means fully described in Letters Patent No. 2,337,558. By pressure of the fluid in the front end of the cylinder 40 the wiper carrier is retracted beyond its normal position against the resistance of the spring 64, the limit of its retractive movement being determined by engagement of a collar 68 on the piston rod 42 with a shoulder 70 on the toe head 22. When the wiper carrier is thus retracted beyond its normal position a screw 72 thereon serves by engagement with one of the arms 46 also to retract the toe former 18 beyond its normal position against the resistance of the spring 54. As explained in the last-mentioned Letters Patent, in operating on shoes of certain styles the toe former may, if desired, be held in its fully retracted position during the greater portion of the next upward movement of the toe head 22 by engagement of a latch 74 with the rear end of the arm 56 and then released by the latch to permit it to assume its normal position determined by engagement of the screw 58 with the lug 60. To simplify the present description, however, it will be usually hereinafter assumed that the latch 74 is inoperative and accordingly that the toe former returns to its normal position when the wiper carrier 36 is returned by the spring 64 upon release of the fluid from the front end of the cylinder 40.

After the wiping of the toe end of the upper heightwise of the last and while it is held conformed to the last by the toe former 18 its margin, outspread on the wipers, is operated upon by upper-trimming means to remove therefrom all but the outer layer of the upper materials, and later in the cycle cement is applied to the toe end of the shoe by cement-applying means for securing the margin of the outer layer of the upper to the insole when it is wiped inwardly by the toe wipers. As disclosed especially in Letters Patent No. 2,324,509, the upper-trimming means and the cement-applying means are combined for swinging movement as a unit about a vertical axis to bring the cement-applying means into position over the shoe after the trimming means has operated thereon and for vertical movement to bring each of said means into operative position. The trimming means comprises an end trimming knife 76 movable lengthwise of the shoe (Figs. 8 and 19) and a pair of side trimming knives 78 movable widthwise of the shoe. In operating on the upper the cutting edges of the several knives move in a plane parallel to the top faces of the toe wipers 20 at a distance from these faces substantially equal to the thickness of the outer layer of the upper materials, the side knives acting on the upper prior to the end knife. Movable with the side knives are vertical slitting knives 79 which sever from the rest of the upper the opposite ends of the strip of waste material, as disclosed in Letters Patent No. 2,363,004, granted on November 21, 1944, on an application of mine. At the beginning of the upper-trimming operation the margin of the upper is held outspread over the wipers by the grippers 14 and 16, but the grippers release the upper and are retracted in time to clear the knives. The cement-applying means includes an insole-engaging member 80 (Figs. 11 and 20) having therein a plurality of holes 82 through which cement is forced as the member in its downward movement approaches the insole. Formed on this member is an inclined face 84 (Fig. 12) by engagement with which the margin of the upper forces the member yieldingly upward away from the insole as the wipers 20 are moved inwardly, the member accordingly having the function of a retarder.

At this point the manner of operation of the machine in lasting the toe-end portion of the shoe, which is substantially the same as described in Letters Patent No. 2,337,558, may be conveniently summarized with reference to the chart (Fig. 21) which illustrates the timing of the different operations. On this chart the double lines indicate the times when the operating fluid is being admitted to the respective cylinders or is being maintained under pressure therein, and the single lines indicate the times when the fluid is being or has been exhausted from the respective cylinders.

As previously explained, after the shoe has been presented by the operator in the position determined by the member 2 and its spur 4, the grippers 14 and 16 are closed by fluid-pressure means on the margin of the toe end of the upper prior to the starting of the cycle of operations, thus enabling the operator to ascertain that the upper has been properly gripped. Immediately after the starting of the cycle the toe rest 10 and the instep support 12 are moved into engagement with the shoe as shown in Fig. 7 and the heel rest 13 also receives its operative movement. Substantially at the beginning of the cycle, moreover, fluid is admitted to the front end of the cylinder 40, as indicated at the bottom of the chart, to retract the wiper carrier 36 from its normal position to the position determined by engagement of the washer 68 with the shoulder 70, the purpose being to insure that the toe former, if the latch 74 is in use, will be held in its fully retracted position. Shortly thereafter the fluid is released from the front end of the cylinder, whereupon the wiper carrier and, if the latch is not in use, the toe former return to their normal positions. Near the beginning of the cycle also the grippers 14 and 16 are operated to pull the upper in outward directions. While the grippers are holding the upper under tension the upper-trimming and cement-applying unit is moved downwardly to bring the upper-trimming means into position to operate on the shoe and upward movement is imparted to the toe head 22 to cause the toe former 18 to wipe the upper heightwise of the last, the parts being then positioned as shown in Fig. 8. The next operation performed is the trimming of the upper by the movements of the knives 76 and 78, the action of the end knife 76 on the upper being illustrated in Fig. 9. In the course of the trimming operation the grippers are opened and are retracted to clear the knives. After the upper-trimming operation the trimming means is moved upwardly away from the shoe and the knives receive their return movements.

Shortly after the trimming of the upper fluid is again admitted to the front end of the cylinder 40 to retract the wiper carrier 36 to the position determined by engagement of the collar 68 with the shoulder 70 and thereby also to retract the toe former from the shoe lengthwise thereof, and while the toe former is thus held out of engagement with the upper the fluid is released from the cylinders 28 to cause the toe head 22 to carry the toe former downwardly, as illustrated in Fig. 10. Just after the toe head starts to move downwardly the grippers are moved inwardly toward the shoe into positions where the outturned margin of the outer layer of the upper is between the gripper jaws, as also illustrated in Fig. 10. At substantially the same time the upper-trimming and cement-applying unit is swung to bring the cement-applying means to a position over the toe end of the shoe. Thereafter the grippers are again closed and are operated to pull the upper as before, the pull being applied, however, only to the outer layer of the upper materials. The cement-applying means is then moved downwardly to bring the member 80 into engagement with the insole and to apply cement to the insole. At substantially the same time the fluid is released from the front end of the cylinder 40 to cause the toe former again to assume its normal position lengthwise of the shoe, and the toe head is then moved upwardly once more to cause the toe former to wipe the upper heightwise of the last, as illustrated in Fig. 11. The toe wipers 20 are next advanced and closed to wipe the margin of the outer layer of the upper inwardly over the insole, the grippers being opened to release the upper just as the wipers begin to wipe it inwardly. In this operation of the wipers the member 80 is forced upwardly by the pressure of the upper on its inclined face 84, this member accordingly acting as a retarder on the upper and applying some of the cement to the inner face of the upper (Fig. 12). The wipers at the end of their inward movements are in positions such as illustrated in Fig. 13. After the wipers have arrived in those positions fluid is released from the cylinders 28 to cause the wipers to increase their downward pressure on the margin of the upper. Thereafter the machine comes to a stop to allow more time for the setting of the cement. After a brief interval it is again started to complete the cycle of operations. During the remainder of the cycle the parts not already in their starting positions are returned to those positions and the shoe is released. Before the wipers are retracted, however, from over the shoe fluid is admitted again to the cylinders 28 to relieve the downward pressure of the wipers on the margin of the upper.

Figure 1:
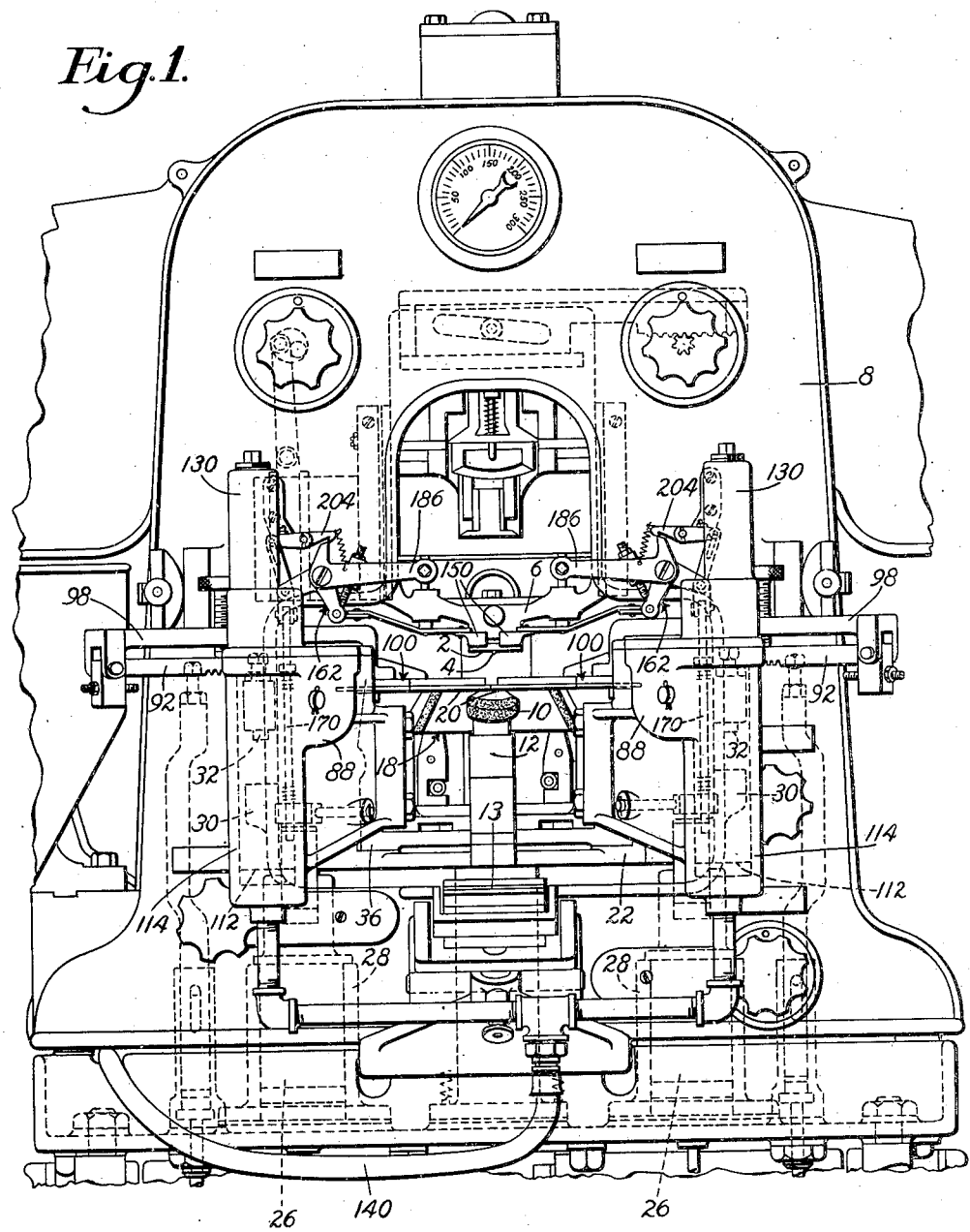
Fig. 1 is a view in front elevation of the upper portion of the machine in which the invention is herein shown as embodied.

For purposes of this invention the opposite side portions of the toe wiper carrier 36 are extended forwardly toward the front of the machine, and secured by screws 86 to these forwardly extending portions are two castings 88 (Figs. 1, 2 and 4). Mounted in a guideway 90 in each of these castings is a slide 92 confined in the guideway by a cover 94 fast on the casting. Pivotally mounted on a pin 96 in the outer end of each slide 92 is a side wiper carrier 98 on the inner end of which a side wiper 100 is secured by screws 102. The side wipers 100 are constructed and arranged to wipe the margin of the upper inwardly over the insole along the sides of the forepart from the toe portion to the beginning of the shank portion of the shoe in response to inward movements of the slides 92, the guideways 90 for these slides being so arranged that the wipers in their inward movements widthwise of the shoe have components of movement also lengthwise of the shoe toward its toe end. Each wiper 100 includes a rigid plate 104 and a resiliently flexible plate 106 secured by screws 108 (Fig. 3) to that end of the plate 104 which is nearer the toe end of the shoe. Threaded in the other end of the plate 104 is a screw 110 which engages the flexible plate 106 and springs it more or less downwardly to conform better to the curved contour of the bottom of the shoe heelwardly of the ball line.

Wiper-operating movements are imparted to the slides 92 by fluid-operated pistons 112 movable heightwise of the shoe in cylinders 114 which are parts of the castings 88. Each piston has thereon rack teeth 116 in engagement with a pinion 118 rotatably mounted on a rod 120 in the casting 88, and integral with this pinion is another pinion 122 in engagement with rack teeth 124 on the slide 92. Each piston 112 is movable upwardly against the resistance of a spring 126 the lower portion of which is mounted in a bore in the piston and the upper end of which is engaged by a plug 128 threaded in an upwardly extending cylindrical portion 130 of the cover 94. A rod 132 extending downwardly from the plug 128 assists in maintaining the spring in proper position. Wiper-operating movement of each slide 92 is limited by engagement of a screw 134 carried by the slide with a stop face 136 (Fig. 6) on the casting 88. It will be understood that when the operating fluid is released from the cylinders 114 the pistons 112 and the side wipers 100 are returned to their starting positions by the springs 126, their return movements being limited by engagement of portions of the wiper carriers 98 with edge faces 138 on the castings 88, as illustrated in Fig. 4. Fluid is conducted to the cylinders 114 from the source of supply through a conduit including a flexible tube 140 (Fig. 1.) Admission of the fluid to the cylinders and release of the fluid therefrom at the proper times in the cycle of operations are automatically controlled by a valve (not shown) like the valves associated with other operating instrumentalities of the machine in accordance with the disclosure of Letters Patent No. 2,337,558.

The pivotal mounting of the side wiper carriers 98 on the pins 96 permits relative movement of the side wipers 100 and the castings 88 heightwise of the shoe, as more particularly hereinafter explained. The normal position of each side wiper heightwise of the shoe relatively to the slide 92 is adjustably determined by a screw 142 which is threaded in the wiper carrier 98 and engages the top face of the slide 92, the cover 94 being provided with a slot 144 through which the screw extends. Threaded in the slide 92 is another screw 146 extending through the slot 144 and through a spring 148 confined between the head of the screw and a socket in the wiper carrier 98. This spring accordingly holds the wiper carrier down in the position determined by the screw 142 but is yieldable to permit the above-mentioned relative movement of the wiper 100 and the casting 88.

Arranged to cooperate with each of the side wipers 100 in controlling the margin of the upper as it is wiped inwardly over the insole is a retarder 150 which presses the margin of the upper against the edge of the wiper along the widest portion of the forepart of the shoe and is curved lengthwise of the shoe in general accordance with the curvature of the corresponding portion of the edge of the shoe bottom. Each retarder 150 is pivotally supported by means of a stud 152 on the inner end of an outwardly extending link 154 with provision for limited movement about the stud to permit it to adjust itself to the margin of the upper and the edge of the wiper. At its outer end the link 154 is pivotally connected by a stud 156 to a member 158 pivotally mounted on one arm 160 of a bell-crank lever 162 which is mounted for swinging movement on a stud 164 on the frame of the machine. The other arm 166 of the bell-crank lever is connected by a universal coupling 168 to the upper end of a rod 170 extending downwardly through an opening in a block 172 (Fig. 4) provided with a stem 174 mounted to turn in a bearing in the casting 88. Between the block and a collar 176 fast on the rod is a spring 178, and threaded on the rod below the block is a nut 180. Accordingly, when the toe head 22 is moved upwardly the first time to cause the toe former 18 to wipe the upper heightwise of the last before the upper-trimming operation, the block 172 acts through the spring 178 to raise the rod 170 and thereby to swing the bell-crank lever 162 in the direction to move the retarder 150 outwardly over the insole from an initial position in which it is shown in Fig. 14 to the position in which it is shown in Fig. 15, thus causing it to spread the margin of the upper from over the insole and to hold it adjacent to the edge of the insole in position to be engaged by the wiper 100. The limit of such outward movement of the retarder is adjustably determined by engagement of the arm 166 of the bell-crank lever with a screw 182 which is threaded in a bracket 184 fast on the frame. The link 154 which supports the retarder is further controlled by a lever 186 also pivotally mounted on the stud 164 and connected to a rod 188 slidingly movable vertically in the casting 6, the rod extending downwardly through a slot 190 in the link 154 and having a head 192 on its lower end for supporting the link. Mounted in a socket in the casting 6 and engaging a collar 194 fast on the lower end portion of the rod 188 is a spring 196. Initially the arm 160 of the bell-crank lever 162 engages a screw 198 which is threaded in the lever 186 and through the lever and the rod 188 holds the link 154 at such a height that the retarder 150 is spaced somewhat above the insole when the shoe is presented to the machine, as illustrated in Fig. 14. It will be understood that the initial position of the bell-crank lever 162 is determined by engagement of the block 172 with the nut 180. When the casting 88 is moved upwardly as described the arm 160 moves away from the screw 198, thus permitting the spring 196 to move the retarder downwardly into engagement with the insole and to press it yieldingly on the insole as it is moved outwardly toward the edge thereof. It will further be understood that an additional function of the retarder is to hold the margin of the insole down on the bottom of the last when the wiper 100 begins to wipe the upper inwardly.

Each of the retarders 150 has an upper-engaging face 200 (Fig. 14) so inclined that when the margin of the upper is pressed against it by the corresponding side wiper 100 the retarder is forced upwardly against the resistance of the spring 196 to permit the wiper to move inwardly under it until the retarder rests on the top of the wiper (see Fig. 16), the lever 186 being swung about the stud 164 in response to such upward movement of the retarder. As more fully hereinafter described, the side wipers 100 are operated after the first upward movement of the toe head 22 and remain over the shoe bottom while the toe head is thereafter lowered and moved upwardly again. As already explained, the toe wipers 20 are operated after the second upward movement of the toe head. The toe wipers in their operative movements overlap portions of the margin of the upper wiped inwardly by the side wipers, and in order to prevent interference between the toe wipers and the side wipers the latter are withdrawn from over the shoe bottom before the toe wipers complete their operative movements. In order to prevent any interference between the retarders and the toe wipers, the retarders are held upraised in the positions to which they are forced by the side wipers when the latter are withdrawn from over the shoe bottom. For this purpose there is associated with an upwardly extending arm 202 of each of the levers 186 a latch 204 pivotally mounted on a pin 206 on the bracket 184, and a spring 208 extending from the latch to the lever 186 tends to swing the latch downwardly. Initially the latch is held at such a height as to clear the arm 202, as shown in Fig. 14. For this purpose a tail 210 on the latch carries a pin 212 which extends through a slot 214 in a link 216 pivotally connected to the arm 166 of the bell-crank lever 162, the link initially engaging the pin at the upper end of the slot. When the toe head is first moved upwardly the upward movement of the link 216 permits the latch to be swung downwardly by the spring 208, the arm 202 being swung simultaneously to such a position that the latch engages the end face of the arm as shown in Fig. 15. When the retarder 150 is forced upwardly by the wiper 100 the arm 202 is swung reversely to such a position that the latch is moved by the spring 208 into position to hold the arm, as shown in Fig. 16. The latch remains in operative position when the toe head is thereafter lowered, since the toe head at this time, as hereinafter more fully explained, does not move all the way down because the wipers 100 are positioned over the shoe. That is, the link 216 does not move downwardly far enough to lift the latch. When the toe head later receives its final downward movement to starting position the latch is returned to its inoperative position.

The manner of operation of the side wipers and the retarders and the timing of their movements in the cycle of operations of the machine as a whole, while explained for the most part above, will now be briefly summarized. It will be understood that when the shoe comes to the machine it has already been subjected to the usual pulling-over operation, the upper being held at the sides of the toe near the location of the tip line by pulling-over tacks $t$ (Fig. 19), and usually also the shank portion of the shoe has been lasted. Contrary, however, to the practice preferably involved in the use of the machines shown in the previously mentioned Letters Patent, the shoe has not been lasted from the toe portion to the beginning of the shank portion, i. e., mainly at the ball portion. Before the shoe is presented to the machine suitable lasting cement, which may be rubber latex, is applied to the margin of the insole and the margin of the upper materials from the toe portion to the shank portion. When the toe head 22 is moved upwardly the first time to cause the toe former 18 to wipe the toe-end portion of the upper heightwise of the last, it carries the side wipers 100 and their operating mechanisms with it. By this upward movement of the toe head the bell-crank levers 162 are operated to move the retarders 150 from the positions in which they are shown in Fig. 14 outwardly to the edge of the insole (Figs. 15 and 19) to spread the margin of the upper from over the insole, the retarders being at the same time moved downwardly upon the insole and pressed thereon by the springs 196. While the toe head is at the limit of its upward movement the trimming of the margin of the toe end of the upper takes place as already explained and, as indicated on the chart (Fig. 21), the side wipers are then operated to wipe the margin of the upper along the sides of the forepart of the shoe from the toe portion to the shank portion inwardly over the insole into lasted position. As the side wipers are thus moved inwardly they force the retarders upwardly away from the insole to positions where they are retained by the latches 204. While the side wipers are over the shoe bottom the toe wiper carrier 36 receives its short retractive movement lengthwise of the shoe to disengage the toe former 18 from the upper, and as a result of that movement the side wipers supported by this carrier have an ironing action on the margin of the upper lengthwise of the shoe toward the end of the toe, their flexible plates 106 also pressing more firmly on the insole the portions of the margin of the upper opposite the downwardly curved portions of the last bottom extending heelwardly of the ball line. The toe head is then moved downwardly, as hereinbefore described and as illustrated in Fig. 10, to retract the toe former heightwise of the shoe preparatory to its second upwiping action on the upper. Since the side wipers are still over the shoe at this time the toe head does not move all the way down to its initial position, its downward movement being limited by the engagement of flanges 218 on the side wiper carriers 93 with stop faces 220 on the slides 92 (see Fig. 17). It will be evident that in response to the downward movement of the toe head the side wipers receive tipping movements against the resistance of the springs 148 about axes extending lengthwise of the shoe, i. e., about the pins 96, thus increasing their pressure on portions of the margin of the upper near the edge of the insole (Fig. 16). When the toe wiper carrier 36 is thereafter moved forwardly to cause the toe former to assume the proper relation to the shoe for its second upwiping action on the upper, the side wipers have a second ironing action on the margin of the upper, this time in a heelward direction. After the second upward movement of the toe head, in the course of which the side wipers return to their normal positions in relation to the slides 92, the side wipers are retracted from over the shoe bottom in time to clear the toe wipers which in their operative movements overlap to some extent lengthwise of the shoe portions of the margin of the upper previously wiped inwardly by the side wipers (see Fig. 18). When the side wipers are thus retracted the retarders 150 are still held up by the latches 204 to prevent interference with the toe wipers, the latches thereafter being moved to inoperative positions in response to the final downward movement of the toe head during which the retarder-controlling levers 162 are returned to their initial positions.

Having described the invention, what I claim as new and desire to secure by Letters Patent of the United States is:

1. In a lasting machine, means for trimming from the margin of the toe-end portion of a multi-ply upper on a last all but the outer layer of the upper materials, means for laying the margin of the outer layer inwardly over an insole on the last after the upper-trimming operation, and additional means for laying the margin of the upper inwardly over the insole along the sides of the forepart beyond the toe portion also after the upper-trimming operation on the toe portion but prior to the laying of the margin of the toe portion over the insole.

2. In a lasting machine, means for trimming from the margin of the toe-end portion of a multi-ply upper on a last all but the outer layer of the upper materials, toe wipers movable to wipe the margin of the outer layer inwardly over an insole on the last after the upper-trimming operation, side wipers for wiping the margin of the upper inwardly over the insole along the sides of the forepart beyond the toe portion, and means for thus operating the side wipers also after the upper-trimming operation in automatically determined time relation to the operative movements of the toe wipers.

3. In a lasting machine, means for trimming from the margin of the toe-end portion of a multi-ply upper on a last all but the outer layer of the upper materials, toe wipers movable to wipe the margin of the outer layer inwardly over an insole on the last after the upper-trimming operation, side wipers for wiping the margin of the upper inwardly over the insole along the sides of the forepart beyond the toe portion, and automatic means for thus operating the side wipers also after the upper-trimming operation but prior to the operation of the toe wipers and for withdrawing them from over the shoe bottom prior to the completion of the operative movements of the toe wipers.

4. In a lasting machine, means for trimming from the margin of the toe-end portion of a multi-ply upper on a last all but the outer layer of the upper materials, toe wipers movable to wipe the margin of the outer layer inwardly over an insole on the last after the upper-trimming operation, a cylinder-and-piston device for thus operating the toe wipers by fluid pressure, side wipers for wiping the margin of the upper inwardly over the insole along the sides of the forepart beyond the toe portion, and cylinder-and-piston devices associated respectively with said side wipers for operating them by fluid pressure also after the upper-trimming operation in automatically determined time relation to the movements of the toe wipers.

5. In a lasting machine, means movable heightwise of a last to conform the toe-end portion of a multi-ply upper to the contour of the last, upper-trimming means movable to trim from the margin of the toe end of the upper all but the outer layer of the upper materials while the upper is held by said conforming means, means for laying the margin of the outer layer of the toe-end portion of the upper inwardly over an insole on the last after the upper-trimming operation, said overlaying means being movable heightwise of the last with said conforming means, and additional means also movable heightwise of the last with said conforming means for laying the margin of the upper inwardly over the insole along the sides of the forepart beyond the toe portion.

6. In a lasting machine, means movable heightwise of a last to conform the toe-end portion of a multi-ply upper to the contour of the last, upper-trimming means movable to trim from the margin of the toe end of the upper all but the outer layer of the upper materials while the upper is held by said conforming means, toe wipers for wiping the margin of the outer layer of the toe-end portion of the upper inwardly over an insole on the last after the upper-trimming operation, said toe wipers being movable heightwise of the last with said conforming means, side wipers also movable heightwise of the last with said conforming means, and means for operating the side wipers to wipe the margin of the upper inwardly over the insole along the sides of the forepart beyond the toe portion also after the upper-trimming operation in automatically determined time relation to the wiping movements of the toe wipers.

7. In a lasting machine, means movable heightwise of a last to conform the toe-end portion of a multi-ply upper to the contour of the last, upper-trimming means movable to trim from the margin of the toe end of the upper all but the outer layer of the upper materials while the upper is held by said conforming means, toe wipers movable to wipe the margin of the outer layer of the toe-end portion of the upper inwardly over an insole on the last after the upper-trimming operation, said toe wipers being movable heightwise of the last with said conforming means, side wipers also movable heightwise of the last with said conforming means, and automatic means for operating the side wipers to wipe the margin of the upper inwardly over the insole along the sides of the forepart beyond the toe portion also after the upper-trimming operation and for withdrawing them from over the shoe bottom prior to the completion of the wiping movements of the toe wipers.

8. In a lasting machine, means movable heightwise of a last in wiping engagement with the toe-end portion of an upper to conform the upper to the contour of the last, toe wipers movable to wipe the margin of the toe-end portion of the upper inwardly over an insole on the last, said toe wipers being movable heightwise of the last with said conforming means, and side wipers also movable heightwise of the last with said conforming means and movable to wipe the margin of the upper inwardly over the insole along the sides of the forepart beyond the toe portion.

9. In a lasting machine, means movable heightwise of a last in wiping engagement with the toe-end portion of an upper to conform the upper to the contour of the last, toe wipers movable to wipe the margin of the toe-end portion of the upper inwardly over an insole on the last, said toe wipers being movable heightwise of the last with said conforming means, side wipers also movable heightwise of the last with said conforming means, and means for operating the side wipers in automatically determined time relation to the toe wipers to wipe the margin of the upper inwardly over the insole along the sides of the forepart beyond the toe portion.

10. In a lasting machine, means movable heightwise of a last in wiping engagement with the toe-end portion of an upper to conform the upper to the contour of the last, toe wipers movable to wipe the margin of the toe-end portion of the upper inwardly over an insole on the last, said toe wipers being movable heightwise of the last with said conforming means, side wipers also movable heightwise of the last with said conforming means, and automatic means for operating the side wipers to wipe the margin of the upper inwardly over the insole along the sides of the forepart beyond the toe portion prior to the operative movements of the toe wipers and for withdrawing them from over the insole prior to the completion of the operative movements of the toe wipers.

11. In a lasting machine, means movable heightwise of a last to conform the toe-end portion of an upper to the contour of the last, toe wipers movable to wipe the margin of the toe-end portion of the upper inwardly over an insole on the last, said toe wipers being movable heightwise of the last with said conforming means, side wipers also movable heightwise of the last with said conforming means and movable to wipe the margin of the upper inwardly over the insole along the sides of the forepart beyond the toe portion, and cylinder-and-piston devices movable heightwise of the last with said conforming means for operating said toe wipers and side wipers by fluid pressure.

12. In a lasting machine, means movable heightwise of a last to conform the toe-end portion of an upper to the contour of the last, toe wipers movable to wipe the margin of the toe-end portion of the upper inwardly over an insole on the last, said toe wipers being movable heightwise of the last with said conforming means, side wipers also movable heightwise of the last with said conforming means and movable to wipe the margin of the upper inwardly over the insole along the sides of the forepart beyond the toe portion, and cylinder-and-piston devices movable heightwise of the last with said conforming means and associated respectively with said side wipers for operating them by fluid pressure at a different time than the toe wipers.

13. In a lasting machine, toe wipers for wiping the margin of an upper about the toe end of a last inwardly over an insole on the last, side wipers for wiping the margin of the upper inwardly over the insole along the sides of the forepart beyond the toe portion, a support common to said toe wipers and side wipers and movable to carry them heightwise of the last in the course of the operation of the machine, and cylinder-and-piston devices carried by said support for operating said toe wipers and side wipers by fluid pressure.

14. In a lasting machine, toe wipers for wiping the margin of an upper about the toe end of a last inwardly over an insole on the last, side wipers for wiping the margin of the upper inwardly over the insole along the sides of the forepart beyond the toe portion, a support common to said toe wipers and side wipers and movable to carry them heightwise of the last in the course of the operation of the machine, a cylinder and a piston carried by said support and relatively movable lengthwise of the last to operate the toe wipers, and other cylinders and pistons also carried by said support and relatively movable heightwise of the last to operate the side wipers.

15. In a lasting machine, means for trimming from the margin of the toe-end portion of a multi-ply upper on a last all but the outer layer of the upper materials, a toe former constructed and arranged to extend about the toe end of the upper, a support for said toe former operatively movable to carry it heightwise of the last in wiping engagement with the upper first prior to the upper-trimming operation and thereafter a second time after the upper-trimming operation following a reverse movement thereof, toe wipers carried by said support for wiping the margin of the outer layer of the toe-end portion of the upper inwardly over an insole on the last after the second operative movement of the support, side wipers also carried by said support, and means for operating the side wipers to wipe the margin of the upper inwardly over the insole along the sides of the forepart beyond the toe portion after the first operative movement of the support and for maintaining them in engagement with the overwiped margin of the upper during the reverse movement and the second operative movement of the support.

16. In a lasting machine, means for trimming from the margin of the toe-end portion of a multi-ply upper on a last all but the outer layer of the upper materials, a toe former constructed and arranged to extend about the toe end of the upper, a support for said toe former operatively movable to carry it heightwise of the last in wiping engagement with the upper first prior to the upper-trimming operation and thereafter a second time after the upper-trimming operation following a reverse movement thereof, toe wipers carried by said support for wiping the margin of the outer layer of the toe-end portion of the upper inwardly over an insole on the last after the second operative movement of the support, side wipers also carried by said support, and means for operating the side wipers to wipe the margin of the upper inwardly over the insole along the sides of the forepart beyond the toe portion after the first operative movement of the support prior to its reverse movement and for withdrawing them from over the shoe bottom after the second operative movement of the support prior to the completion of the operative movements of the toe wipers.

17. In a lasting machine, means for trimming from the margin of the toe-end portion of a multi-ply upper on a last all but the outer layer of the upper materials, a toe former constructed and arranged to extend about the toe end of the upper, a support for said toe former operatively movable to carry it heightwise of the last in wiping engagement with the upper first prior to the upper-trimming operation and thereafter a second time after the upper-trimming operation following a reverse movement thereof, toe wipers carried by said support for wiping the margin of the outer layer of the toe-end portion of the upper inwardly over an insole on the last after the second operative movement of the support, side wipers also carried by said support, means for operating the side wipers to wipe the margin of the upper inwardly over the insole along the sides of the forepart beyond the toe portion after the first operative movement of the support and for maintaining them in engagement with the overwiped margin of the upper during the reverse movement of the support, and spring means for pressing the side wipers heightwise of the last on the margin of the upper while permitting the support to move relatively to them during its reverse movement.

18. In a lasting machine, means for trimming from the margin of the toe-end portion of a multi-ply upper on a last all but the outer layer of the upper materials, a toe former constructed and arranged to extend about the toe end of the upper, a support for said toe former operatively movable to carry it heightwise of the last in wiping engagement with the upper first prior to the upper-trimming operation and thereafter a second time after the upper-trimming operation following a reverse movement thereof, toe wipers carried by said support for wiping the margin of the outer layer of the toe-end portion of the upper inwardly over an insole on the last after the second operative movement of the support, side wipers also carried by said support, and means for operating the side wipers to wipe the margin of the upper inwardly over the insole along the sides of the forepart beyond the toe portion after the first operative movement of the support and for maintaining them in engagement with the overwiped margin of the upper during the reverse movement of the support, the side wipers being mounted to tip relatively to the support during its reverse movement in response to pressure of the shoe thereon.

19. In a lasting machine, means for trimming from the margin of the toe-end portion of a multi-ply upper on a last all but the outer layer of the upper materials, a toe former constructed and arranged to extend about the toe end of the upper, a support for said toe former operatively movable to carry it heightwise of the last in wiping engagement with the upper first prior to the upper-trimming operation and thereafter a second time after the upper-trimming operation following a reverse movement thereof, toe wipers carried by said support for wiping the margin of the outer layer of the toe-end portion of the upper inwardly over an insole on the last after the second operative movement of the support, side wipers also carried by said support, means for operating the side wipers to wipe the margin of the upper inwardly over the insole along the sides of the forepart beyond the toe portion after the first operative movement of the support and for maintaining them in engagement with the overwiped margin of the upper during the reverse movement of the support, spring means against the resistance of which the side wipers are mounted to tip relatively to the support during its reverse movement, and means for limiting the reverse movement of the support by limiting such tipping of the wipers.

20. In a lasting machine, toe wipers for wiping the margin of an upper about the toe end of a last inwardly over an insole on the last, side wipers for wiping the margin of the upper inwardly over the insole along the sides of the forepart beyond the toe portion, means for thus operating the side wipers, and additional means for thereafter tipping the side wipers heightwise of the last to increase their pressure on portions of the overwiped margin of the upper adjacent to the edge of the insole relatively to their pressure on portions of said margin farther from the edge of the insole before the margin of the toe end of the upper is wiped inwardly by the toe wipers.

21. In a lasting machine, toe wipers for wiping the margin of an upper about the toe end of a last inwardly over an insole on the last, side wipers for wiping the margin of the upper inwardly over the insole along the sides of the forepart beyond the toe portion, means for thus operating the side wipers, and additional means for tipping the side wipers heightwise of the last in engagement with the overwiped margin of the upper to increase their pressure on portions of said margin adjacent to the edge of the insole relatively to their pressure on portions thereof farther from the edge of the insole and for thereafter tipping them reversely before the margin of the toe end of the upper is wiped inwardly by the toe wipers.

22. In a lasting machine, toe wipers for wiping the margin of an upper about the toe end of a last inwardly over an insole on the last, side wipers for wiping the margin of the upper inwardly over the insole along the sides of the forepart beyond the toe portion, a support common to said toe wipers and side wipers and movable heightwise of the last, the side wipers being mounted to tip in response to such movement of said support in one direction to increase their pressure on portions of the overwiped margin of the upper adjacent to the edge of the insole relatively to their pressure on portions thereof farther from the edge of the insole, and means to cause such movement of the support and thereafter reverse movement thereof while the side wipers are over the insole before the margin of the toe end of the upper is wiped inwardly by the toe wipers.

23. In a lasting machine, toe wipers for wiping the margin of an upper about the toe end of a last inwardly over an insole on the last, side wipers for wiping the margin of the upper inwardly over the insole along the sides of the forepart beyond the toe portion, a support common to said toe wipers and side wipers and movable heightwise of the last, the side wipers being mounted to tip in response to such movement of said support in one direction to increase their pressure on portions of the overwiped margin of the upper adjacent to the edge of the insole relatively to their pressure on portions thereof farther from the edge of the insole, means to cause such movement of the support and thereafter reverse movement thereof while the side wipers are over the insole, means for operating the toe wipers to wipe the margin of the toe end of the upper inwardly over the insole after such reverse movement of the support, and means for withdrawing the side wipers from over the insole prior to the completion of the operative movements of the toe wipers.

24. In a lasting machine, a wiper for wiping the margin of an upper inwardly over an insole on a last, a support for said wiper movable heightwise of the last in the direction to increase the pressure of the wiper on the margin of the upper when the wiper is over the insole, the wiper being mounted to tip in response to such movement of the support, a spring against the resistance of which the wiper is thus tipped, and means for limiting the movement of the support by limiting the tipping of the wiper.

25. In a lasting machine, a wiper for wiping the margin of an upper inwardly over an insole on a last positioned bottom upward, a support for said wiper movable downwardly when the wiper is in engagement with the margin of the upper over the insole, a slide on said support movable to force the wiper inwardly over the insole, a wiper carrier pivotally mounted on said slide for tipping movement with the wiper in response to the downward movement of the support, and means for limiting the downward movement of the support by limiting the tipping of the wiper carrier.

26. In a lasting machine, a wiper for wiping the margin of an upper inwardly over an insole on a last, a support for said wiper movable heightwise of the last in the course of the operation of the machine, and fluid-pressure means comprising a cylinder and a piston carried by said support and relatively movable heightwise of the last to operate the wiper to wipe the upper over the insole.

27. In a lasting machine, a wiper for wiping the margin of an upper inwardly over an insole on a last, a slide for thus operating said wiper, a support for said slide movable heightwise of the last in the course of the operation of the machine, fluid-pressure means carried by said support and including a piston movable heightwise of the last, and rack-and-pinion mechanism for operating the slide by the movement of the piston.

28. In a lasting machine, a toe former constructed and arranged to extend about the toe end of an upper on a last, a support for said toe former movable to carry it heightwise of the last in wiping engagement with the upper, wipers carried by said support for wiping the margin of the upper inwardly over an insole on the last at the opposite sides of the forepart, means for moving said support lengthwise of the last to withdraw the toe former from the upper after the wiping of the upper inwardly over the insole by said wipers, and means for maintaining said wipers in engagement with the overwiped margin of the upper to cause them to have an ironing action lengthwise of the last on said margin as the support is thus moved to withdraw the toe former.

29. In a lasting machine, a toe former constructed and arranged to extend about the toe end of an upper on a last, a support for said toe former movable to carry it heightwise of the last in wiping engagement with the upper, wipers carried by said support for wiping the margin of the upper inwardly over an insole on the last at its opposite sides in locations where the bottom of the last curves heightwise heelwardly of the ball line, means for moving said support lengthwise of the last to withdraw the toe former from the upper after the wiping of the upper inwardly over the insole by said wipers, and means for maintaining the wipers in engagement with the overwiped margin of the upper in said locations to cause them to increase their pressure on said margin in response to the movement of the support to withdraw the toe former.

30. In a lasting machine, a toe former constructed and arranged to extend about the toe end of an upper on a last, a support for said toe former movable to carry it heightwise of the last in wiping engagement with the upper, wipers carried by said support for wiping the margin of the upper inwardly over an insole on the last at the opposite sides of the forepart, means for moving said support lengthwise of the last to withdraw the toe former from the upper after the wiping of the upper inwardly over the insole by said wipers and for thereafter moving it in the opposite direction lengthwise of the last, and means for maintaining said wipers in engagement with the overwiped margin of the upper to cause them to have an ironing action lengthwise of the last on said margin in response to the movement of the support in both directions.

31. In a lasting machine, toe wipers for wiping the margin of an upper about the toe end of a last inwardly over an insole on the last, side wipers for wiping the margin of the upper inwardly over the insole along the sides of the forepart beyond the toe portion, means for thus operating the side wipers, and means for thereafter moving the side wipers lengthwise of the last in ironing engagement with the overwiped margin of the upper before the margin of the toe end of the upper is wiped inwardly by the toe wipers.

32. In a lasting machine, toe wipers for wiping the margin of an upper about the toe end of a last inwardly over an insole on the last, side wipers for wiping the margin of the upper inwardly over the insole along the sides of the forepart beyond the toe portion, means for thus operating the side wipers, and means for thereafter moving the side wipers lengthwise of the last in opposite directions successively in ironing engagement with the overwiped margin of the upper before the margin of the toe end of the upper is wiped inwardly by the toe wipers.

33. In a lasting machine, toe wipers for wiping the margin of an upper about the toe end of a last inwardly over an insole on the last, side wipers for wiping the margin of the upper inwardly over the insole at the opposite sides of the last in locations where the bottom of the last curves heightwise heelwardly of the ball line, means for thus operating the side wipers, and means for thereafter moving the side wipers lengthwise of the last toward the end of the toe to increase their pressure on the overwiped margin of the upper in said locations before the margin of the toe end of the upper is wiped inwardly by the toe wipers.

34. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, and means for imparting to said retarders positioning movements relatively to the wipers in response to the movement of said wiper-supporting means heightwise of the last before they clamp the upper against the wipers.

35. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, and means for moving said retarders outwardly over the insole toward the edge thereof in response to the movement of said wiper-supporting means heightwise of the last.

36. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, and means for moving said retarders both heightwise of the last into engagement with the insole and also widthwise of the last outwardly toward the edge of the insole in response to the movement of said wiper-supporting means heightwise of the last.

37. In a lasting machine, wipers for wiping the margin of an upper inwardly over an insole on a last at the opposite sides of the last respectively, means supporting said wipers and movable to carry them heightwise of the last before they act on the upper, retarders for clamping the margin of the upper against the wipers as they begin to wipe it inwardly over the insole, and mechanisms comprising levers arranged to be operated by the movement of said wiper-supporting means heightwise of the last and links connecting said levers to the retarders for moving the retarders outwardly over the insole toward the edge thereof by the levers.

38. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, mechanisms arranged to be operated by the movement of said wiper-supporting means heightwise of the last to move said retarders outwardly over the insole toward the edge thereof, and additional mechanisms controlled by the movement of said wiper-supporting means for moving the retarders heightwise of the last into engagement with the insole and for pressing them yieldingly on the insole.

39. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, mechanisms arranged to be operated in response to the movement of said wiper-supporting means heightwise of the last to move said retarders outwardly over the insole toward the edge thereof, and spring means controlled by movements of said mechanisms for pressing the retarders heightwise of the last on the insole.

40. In a lasting machine, wipers for wiping the margin of an upper inwardly over an insole on a last at the opposite sides of the last respectively, means supporting said wipers and movable to carry them heightwise of the last before they thus act on the upper, retarders for clamping the margin of the upper against the wipers as they begin to wipe it inwardly over the insole, and means for moving said retarders outwardly over the insole toward the edge thereof in response to the movement of said wiper-supporting means heightwise of the last and for thereafter imparting to the retarders return movements widthwise of the last in response to return movement of the wiper-supporting means heightwise of the last.

41. In a lasting machine, a wiper for wiping the margin of an upper inwardly over an insole on a last, a support for said wiper movable to carry it heightwise of the last before it thus acts on the upper, a retarder for clamping the margin of the upper against the wiper in the wiping operation, and means controlled by the movement of said wiper support heightwise of the last for moving the retarder relatively to the wiper from a retracted position outwardly over the insole toward the edge thereof.

42. In a lasting machine, a wiper for wiping the margin of an upper inwardly over an insole on a last, a support for said wiper movable to carry it heightwise of the last before it thus acts on the upper, a retarder for clamping the margin of the upper against the wiper in the wiping operation, mechanism for moving the retarder relatively to the wiper from a retracted position outwardly over the insole toward the edge thereof in response to the movement of said wiper support heightwise of the last, and means controlled by the movement of said mechanism for also moving the retarder heightwise of the last and for pressing it yieldingly on the insole.

43. In a lasting machine, a wiper for wiping the margin of an upper inwardly over an insole on a last, a retarder for clamping the margin of the upper against said wiper in the wiping operation, a lever for controlling said retarder, a link connecting said lever to the retarder for moving the retarder outwardly over the insole toward the edge thereof by movement of the lever, the link being connected to the lever for movements with the retarder heightwise of the last, and another lever connected to the link and mounted to swing heightwise of the last to control the retarder with respect to movement heightwise of the last.

44. In a lasting machine, a wiper for wiping the margin of an upper inwardly over an insole on a last, a retarder for clamping the margin of the upper against said wiper in the wiping operation, a lever for controlling said retarder, a link connecting said lever to the retarder for moving the retarder outwardly over the insole toward the edge thereof by movement of the lever, the link being connected to the lever for movements with the retarder heightwise of the last, and means connected to the link and controlled by said lever for moving the retarder heightwise of the last into engagement with the insole and for pressing it on the insole in response to movement of the lever.

45. In a lasting machine, a wiper for wiping the margin of an upper inwardly over an insole on a last, a retarder for clamping the margin of the upper against said wiper in the wiping operation, a lever for controlling said retarder, a link connecting said lever to the retarder for moving the retarder outwardly over the insole toward the edge thereof by movement of the lever, the link being connected to the lever for swinging movements with the retarder heightwise of the last, another lever controlled by said first-named lever and connected to said link, said other lever being mounted to swing heightwise of the last, and a spring controlled by said other lever for swinging the link heightwise of the last to press the retarder on the insole.

46. In a lasting machine, toe wipers movable to wipe the margin of an upper about the toe end of a last inwardly over an insole on the last, side wipers for wiping the margin of the upper inwardly over the insole along the sides of the forepart beyond the toe portion, means for thus operating the side wipers and for withdrawing them from over the insole prior to the completion of the wiping movements of the toe wipers, the toe wipers being movable in such paths as to overlap portions of the margin of the upper previously engaged by the side wipers, retarders arranged to engage the insole and to cooperate with the side wipers in controlling the margin of the upper as it is wiped inwardly, said retarders being movable heightwise of the last away from the insole in the course of the wiping movements of the side wipers, and means for preventing return movements of said retarders heightwise of the last when the side wipers are withdrawn from over the insole to prevent their interference with the toe wipers.

47. In a lasting machine, toe wipers movable to wipe the margin of an upper about the toe end of a last inwardly over an insole on the last, side wipers for wiping the margin of the upper inwardly over the insole along the sides of the forepart beyond the toe portion, means for thus operating the side wipers and for withdrawing them from over the insole prior to the completion of the wiping movements of the toe wipers, the toe wipers being movable in such paths as to overlap portions of the margin of the upper previously engaged by the side wipers, retarders arranged to engage the insole and to cooperate with the side wipers in controlling the margin of the upper as it is wiped inwardly, said retarders being mounted for movements heightwise of the last away from the insole in response to pressure of the margin of the upper thereon, and devices associated respectively with said retarders for holding them against return movements heightwise of the last when the side wipers are withdrawn from over the insole to prevent their interference with the toe wipers.

48. In a lasting machine, wipers for wiping the margin of an upper inwardly over an insole on a last at the opposite sides of the last respectively, means supporting said wipers and movable to carry them heightwise of the last before they thus act on the upper, retarders arranged to engage the insole and to cooperate with said wipers in controlling the margin of the upper as it is wiped inwardly, said retarders being mounted for movements heightwise of the last away from the insole in response to pressure of the margin of the upper thereon, and means controlled by the movement of said wiper-supporting means heightwise of the last for preventing return movements of said retarders heightwise of the last when the wipers are withdrawn from over the insole.

49. In a lasting machine, wipers for wiping the margin of an upper inwardly over an insole on a last at the opposite sides of the last respectively, means supporting said wipers and movable to carry them heightwise of the last before they thus act on the upper, retarders arranged to engage the insole and to cooperate with said wipers in controlling the margin of the upper as it is wiped inwardly, said retarders being mounted for movements heightwise of the last away from the insole in response to pressure of the margin of the upper thereon, devices for holding said retarders against return movements heightwise of the last when said wipers are withdrawn from over the insole, and means for moving said devices to inoperative position in response to return movement of said wiper-supporting means heightwise of the last.

BERNHARDT JORGENSEN.

REFERENCES CITED

The following references are of record in the file of this patent:

UNITED STATES PATENTS

| Number | Name | Date |
|---|---|---|
| 698,476 | Eder | Apr. 29, 1902 |
| 1,261,483 | Brock | Apr. 2, 1918 |
| 2,346,687 | Jorgensen | Apr. 18, 1944 |
| 2,354,685 | Jorgensen | Aug. 1, 1944 |
| 2,387,331 | Jorgensen | Oct. 23, 1945 |